US 6,665,547 B1

(12) United States Patent
Ehara

(10) Patent No.: US 6,665,547 B1
(45) Date of Patent: Dec. 16, 2003

(54) RADIO COMMUNICATION APPARATUS WITH TELEPHONE NUMBER REGISTERING FUNCTION THROUGH SPEECH RECOGNITION

(75) Inventor: Tatsuji Ehara, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/466,881

(22) Filed: Dec. 20, 1999

(30) Foreign Application Priority Data

Dec. 25, 1998 (JP) .......................................... 10-369778

(51) Int. Cl.$^7$ ............................................. H04B 1/038
(52) U.S. Cl. ...................... 455/563; 455/66.1; 455/563; 455/569.1; 379/88.01; 379/420.02
(58) Field of Search ................................ 455/414, 563, 455/569.1, 66.1; 379/88.01, 88.02, 420.01; 704/1, 235, 251

(56) References Cited

U.S. PATENT DOCUMENTS

| 4,731,811 A | * | 3/1988 | Dubus .......................... 379/58 |
| 4,737,976 A | * | 4/1988 | Borth et al. ................... 379/58 |
| 4,961,212 A | * | 10/1990 | Marui et al. ................... 379/67 |
| 5,095,503 A | * | 3/1992 | Kowalski ....................... 579/59 |
| 5,222,121 A | * | 6/1993 | Shimada ....................... 379/88 |
| 5,265,145 A | * | 11/1993 | Lim .............................. 379/88 |
| 5,420,912 A | * | 5/1995 | Kopp et al. ................... 379/63 |
| 5,450,525 A | * | 9/1995 | Russell et al. ............. 395/2.84 |
| 5,465,401 A | * | 11/1995 | Thompson .................... 455/89 |
| 5,651,056 A | * | 7/1997 | Eting et al. .................... 379/88 |
| 5,659,597 A | * | 8/1997 | Bareis et al. ............... 455/563 |
| 5,752,227 A | * | 5/1998 | Lyberg ......................... 704/235 |
| 6,138,100 A | * | 10/2000 | Dutton et al. ................ 704/275 |
| 6,151,572 A | * | 11/2000 | Cheng et al. ............. 379/88.14 |
| 6,163,596 A | * | 12/2000 | Gelfer et al. ............... 379/67.1 |
| 6,167,251 A | * | 12/2000 | Segal et al. .................. 455/406 |
| 6,192,255 B1 | * | 2/2001 | Lewis et al. ................. 455/558 |
| 6,212,408 B1 | * | 4/2001 | Son et al. .................... 455/563 |
| 6,226,532 B1 | * | 5/2001 | Kim et al. ................... 455/563 |
| 6,236,969 B1 | * | 5/2001 | Ruppert et al. ............. 704/275 |
| 6,301,513 B1 | * | 10/2001 | Divon et al. ................... 700/94 |
| 6,301,593 B1 | * | 10/2001 | Toyosato .................... 708/131 |

FOREIGN PATENT DOCUMENTS

| GB | EP 0619668 A2 | * | 10/1994 | ...................... 1/65 |
| JP | 3-52482 | | 3/1991 | |
| JP | 4-47846 | | 2/1992 | |
| JP | 04-354448 | | 12/1992 | |
| JP | 05-4657 | | 1/1993 | |
| JP | 09-181813 | | 7/1997 | |
| JP | 09-284377 | | 10/1997 | |

* cited by examiner

Primary Examiner—William Trost
Assistant Examiner—Stephen D'Agosta
(74) Attorney, Agent, or Firm—Sughrue Mion, PLLC

(57) ABSTRACT

A radio communication apparatus includes first and second storage sections, a receiving section, a speech recognizing section and a control section. The receiving section receives a speech data transmitted from a counter apparatus, and the speech data includes a telephone number. The control section stores at least a part of the received speech data in a location of the first storage section, extracts the telephone number from the received speech data using the speech recognizing section, and stores the extracted telephone number in the second storage section in association with the predetermined location.

28 Claims, 6 Drawing Sheets

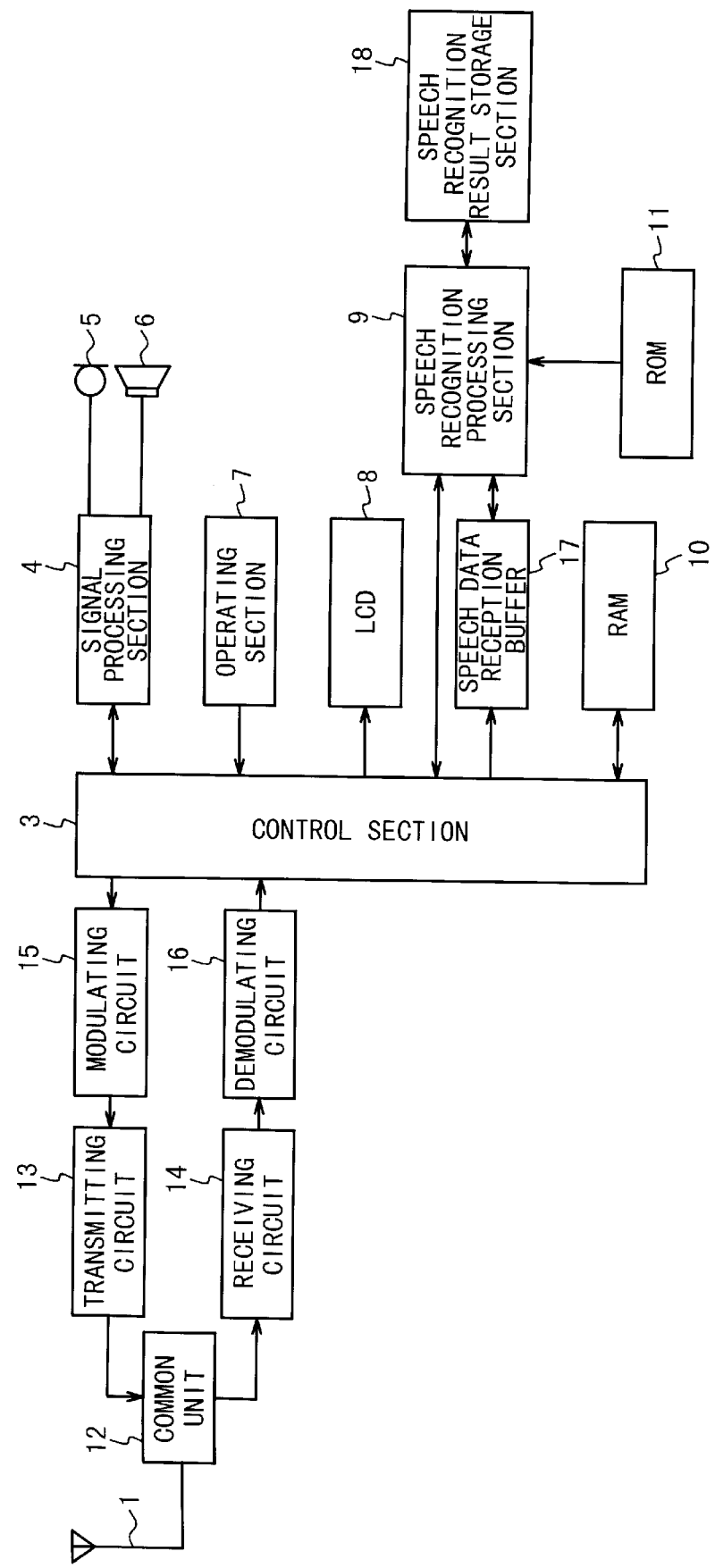

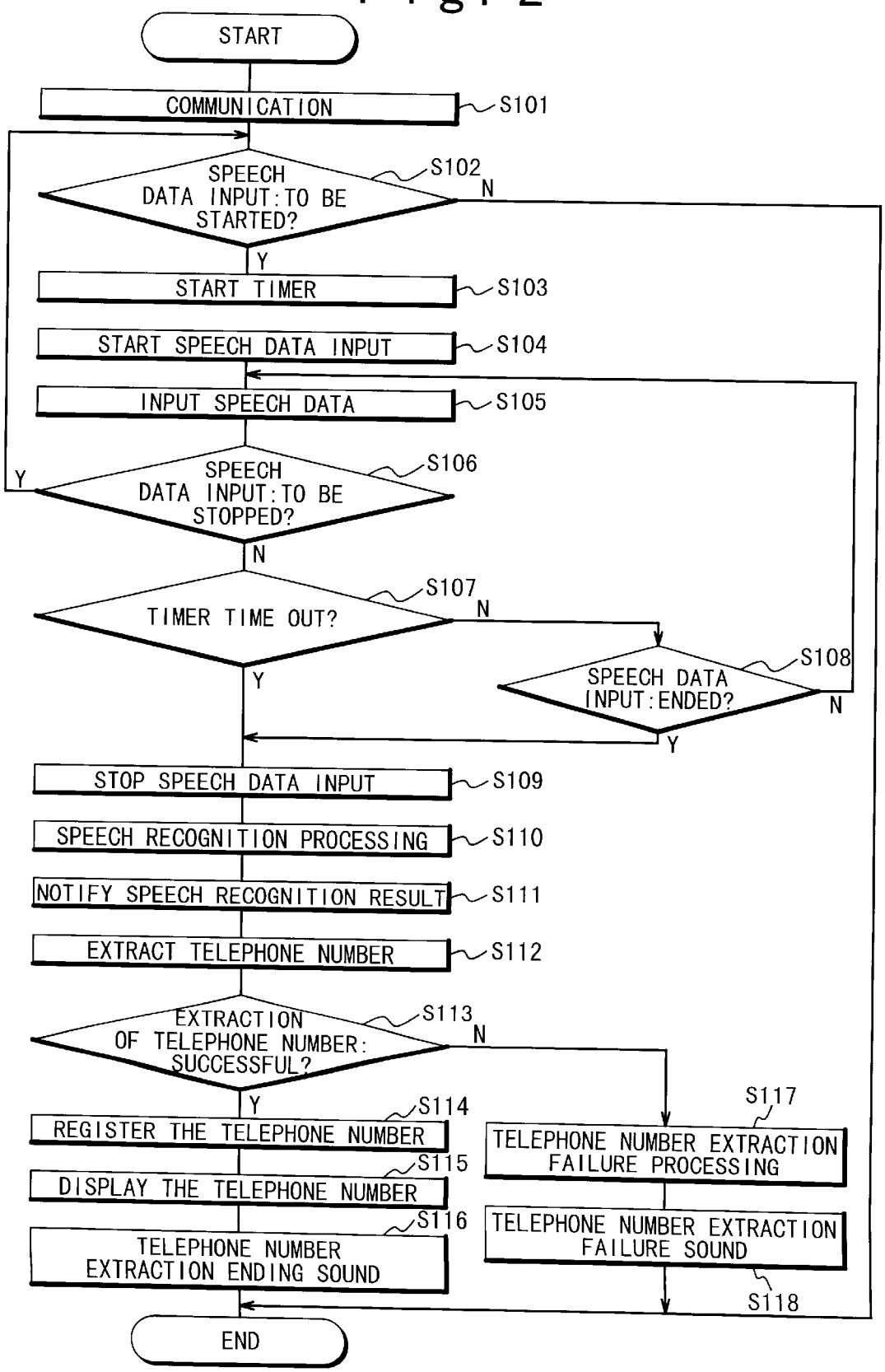

Fig. 4A

| DISTINCTION | NAME STORAGE AREA | TELEPHONE NUMBER STORAGE AREA |
|---|---|---|
| 0 | TARO YAMADA PORTABLE PHONE | 0101234567 |
| 1 | 18:26:35 | 0103334444 |
| 0 | HANAKO YAMADA | 0107654321 |
| ⋮ | ⋮ | ⋮ |

Fig. 4B

| ADDRESS | SPEECH DATA STORAGE AREA |
|---|---|
| 1 | SPEECH DATA 1 STORAGE AREA |
| 2 | SPEECH DATA 2 STORAGE AREA |
| ⋮ | ⋮ |
| n-1 | SPEECH DATA n-1 STORAGE AREA |
| n | SPEECH DATA n STORAGE AREA |

Fig. 5

| TYPE | NUMBER FORMAT | DIGITS |
|---|---|---|
| TELEPHONE NUMBER IN 23 WARDS OF TOKYO | 03-△△△△-□□□□ | 10 DIGITS |
| PORTABLE PHONE | 030-△△△-□□□□ etc. | 10 DIGITS |
| TELEPHONE NUMBER OF OOSAKA | 06-△△△-□□□□ | 9 DIGITS |
| TELEPHONE NUMBER OF PHS | 060-△△△-□□□□ etc. | 10 DIGITS |

RADIO COMMUNICATION APPARATUS WITH TELEPHONE NUMBER REGISTERING FUNCTION THROUGH SPEECH RECOGNITION

BACKGROUND OF THE INVENTION

1. Field of the Invention

The present invention relates to a radio communication apparatus, and more particularly to a radio communication apparatus having a speech recognition function.

2. Description of the Related Art

Conventionally, a radio communication apparatus, such as a portable phone apparatus have a telephone directory. A user operates keys to store a plurality of sets of a telephone number and a name in the telephone directory. The telephone numbers which have been registered on the telephone directory can be read out and displayed on an LCD (liquid crystal display). Also, it is possible to carry out a call originating operation based on one of the telephone numbers which are displayed on the LCD.

However, it is not possible to store a telephone number and a name without any operation of the keys in this type of portable phone apparatus. Therefore, there is a problem that the key operation is very complicated. Especially, it is difficult for the user to operate any keys and to register a telephone number and a name during the communication. Therefore, the telephone number obtained from a counter party during the communication must be noted on paper. Then, it is necessary to store the telephone number and name of the counter party by operating the keys. Also, there is another problem that the user needs to have a sheet of paper and a pen when the user carries the portable phone apparatus, resulting in lack of generality.

In conjunction with the above description, an image and speech transmitting and receiving apparatus is described in Japanese Laid Open Patent Application (JP-A-Heisei 3-52482). In this reference, a recording medium 9 such as an IC card and a floppy disk is set in a recording and reproducing unit 8. The names of individuals, company names, telephone numbers, and addresses are recorded on the recording medium. Such information on the recording medium is load in a memory 18. For example, when one company name is inputted, the telephone numbers associated with the inputted company name are displayed on a monitor 3. Finally, one of the telephone numbers is determined and is transferred to a switching apparatus (not shown) through an interface 7 and a telephone line, resulting in achievement of automatic call origination.

Also, a dialless phone is described in Japanese Laid Open Patent Application (JP-A-Heisei 4-47846). In this reference, a user inquires a destination telephone number to a phone number guidance center. The dialless phone stores a response, including a telephone number of the destination, from the guidance center. Then, the dialless phone extracts the destination telephone number and automatically originates a call based on the extracted destination telephone number.

SUMMARY OF THE INVENTION

Therefore, an object of the present invention is to provide a radio communication apparatus in which a telephone number can be registered on a telephone directory by extracting the telephone number from speech from the counter party.

Also, another object of the present invention is to provide a radio communication apparatus in which when a registered telephone number is read out, a speech is outputted such that it is possible to recognize whom the telephone number is associated with.

In order to achieve an aspect of the present invention, a radio communication apparatus includes first and second storage sections, a receiving section, a speech recognizing section and a control section. The receiving section receives a speech data transmitted from a counter apparatus, and the speech data includes a telephone number. The control section stores at least a part of the received speech data in a location of the first storage section, extracts the telephone number from the received speech data using the speech recognizing section, and stores the extracted telephone number in the second storage section in association with the predetermined location.

Here, the radio communication apparatus may further include an operation section issuing an acquisition start instruction and an acquisition end instruction in response to operations by a user, respectively. The control section controls the receiving section in response to the acquisition start instruction to start acquisition of the speech data and controls the receiving section in response to the acquisition end instruction to end the acquisition of the speech data. When the radio communication apparatus further includes a transmitting section, the control section controls the transmitting section in response to the acquisition start instruction and the acquisition end instruction to transmit first and second sounds to the counter apparatus, respectively. Also, the control section carries out different notifying operations to a user in response to the acquisition start instruction and the acquisition end instruction, respectively.

Also, it is preferable that the speech recognizing section converts the received speech data into a character string through speech recognition in response to a recognition instruction. In this case, the control section generates the recognition instruction to the speech recognizing section and extracts the telephone number from the character string. In this case, the control section may detect a numeric character string from the character string, and determine that the numeric character string is the telephone number, based on a number of digits of the numeric character string and whether the numeric character string has one of predetermined patterns. Also, the control section preferably carries out different notifying operations to a user based on whether or not the extraction of the telephone number has succeeded.

Also, the second storage section may have a first area and a second area. The control section stores the extracted telephone number as a record in the first area of the second storage section. In this case, the speech recognizing section may recognize a data associated with the extracted telephone number from the received speech data. The control section stores the recognized data associated with the extracted telephone number as a part of the record in the second area of the second storage section. Also, when the second storage section further has a third storage area, the control section stores an address of the predetermined location of the first storage section for the extracted telephone number as a part of the record in the third storage area of the second storage section. In this case, the control section may store a telephone number, a name and a predetermined data as a record in the first to third storage areas of the second storage section, respectively, when the telephone number, the name and the predetermined data are inputted from the operation section by a user.

In the radio communication apparatus, when the operation section issues a display instruction in response to an operation by the user, the control section displays contents of the records corresponding to the second storage area of the second storage section on the display section in response to the display instruction. Also, when the operation section issues a specify instruction in response to an operation by the user, the control section displays on a display section, the stored telephone number of a specified one the records which is specified in response to the specify instruction. In addition, the control section may read out the stored speech data corresponding to the specified record based on a content of the specified record corresponding to the third storage area when the content of the specified record is not the predetermined data, and controls an audio output section to output the read out speech data auditorily.

In order to achieve another aspect of the present invention, a method of improving operability of a radio communication apparatus includes:

receiving a speech data transmitted from a counter apparatus, the speech data including a telephone number;

storing at least a part of the received speech data in a location of a first storage section;

extracting the telephone number from the received speech data by use of a speech recognizing function; and storing the extracted telephone number in an address of a second storage section.

In the receiving the speech data, the reception of the speech data is started in response to a acquisition start instruction, and the acquisition of the speech data is stopped in response to an acquisition end instruction. Also, in the receiving the speech data, first and second sounds are transmitted to the counter apparatus in response to the acquisition start instruction and the acquisition end instruction, respectively. Also, in the receiving the speech data, different notifying operations to a user are carried out in response to the acquisition start instruction and the acquisition end instruction, respectively.

In the extracting the telephone number, the received speech data is converted into a character string by use of the speech recognition function, and then the telephone number is extracted from the character string. Also, a numeric character string is detected from the character string, and then it is determined that the numeric character string is the telephone number, based on a number of digits of the numeric character string and whether the numeric character string has one of predetermined formats. In addition, different notifying operations to a user are carried out based on whether or not the extraction of the telephone number has succeeded.

The extracted telephone number as a record may be stored in a first area of the second storage section. In this case, a data associated with the extracted telephone number is recognized from the received speech data, the recognized data associated with the extracted telephone number is stored as a part of the record in a second area of the second storage section. The address of the first storage section for the extracted telephone number is stored as a part of the record in a third storage area of the second storage section. A telephone number, a name and a predetermined data which are inputted by a user may be stored as a record in the first to third storage areas of the second storage section, respectively.

Also, contents of the records corresponding to the second storage area of the second storage section are displayed on a display section in response to a display instruction. Also, the stored telephone number of a specified one the records which is specified in response to a specify instruction is displayed on the display section. The stored speech data corresponding to the specified record is read out based on a content of the specified record corresponding to the third storage area when the content of the specified record is not the predetermined data. Then, the read out speech data is auditorily outputted.

In order to achieve still another aspect of the present invention, a radio communication apparatus includes, a first storage section, a second storage section, an input section, a display section and a control section the first storage section stores speech data corresponding to a record in association with an address. The second storage section having first to third storage areas. The first storage area stores a telephone number of the record, the second storage area storing an association data of the record, the association data being associated with the telephone number, and the third storage area storing the address. The input section is used to input a data and an instruction. The control section displays the association data of the records on the display section in response to a display instruction inputted from the input section by a user. Also, the control section may store a telephone number, a name and a predetermined data as a record in the first to third storage areas of the second storage section, respectively, when the telephone number, the name and the predetermined data are inputted from the operation section by a user.

When the operation section issues a specify instruction in response to an operation by the user, the control section preferably displays on the display section, the stored telephone number of a specified one the records which is specified in response to the specify instruction. Also, the control section may read out the stored speech data corresponding to the specified record based on a content of the specified record corresponding to the third storage area when the content of the specified record is not the predetermined data, and control the audio output section to output the read out speech data auditorily.

BRIEF DESCRIPTION OF THE DRAWINGS

FIG. 1 is a block diagram which shows the circuit structure of the portable phone apparatus according to an embodiment of the present invention;

FIG. 2 is a flow chart which shows a registering operation on a telephone directory through speech recognition in the portable phone apparatus according to the embodiment of the present invention;

FIGS. 4A and 4B are the internal structures of a RAM which stores a telephone directory data and of a speech data in the portable phone apparatus according to the embodiment of the present invention;

FIG. 5 is a diagram to explain a method of extracting a telephone number in case of the registering operation in the portable phone apparatus according to the embodiment of the present invention.

DESCRIPTION OF THE PREFERRED EMBODIMENTS

Figure 3A:
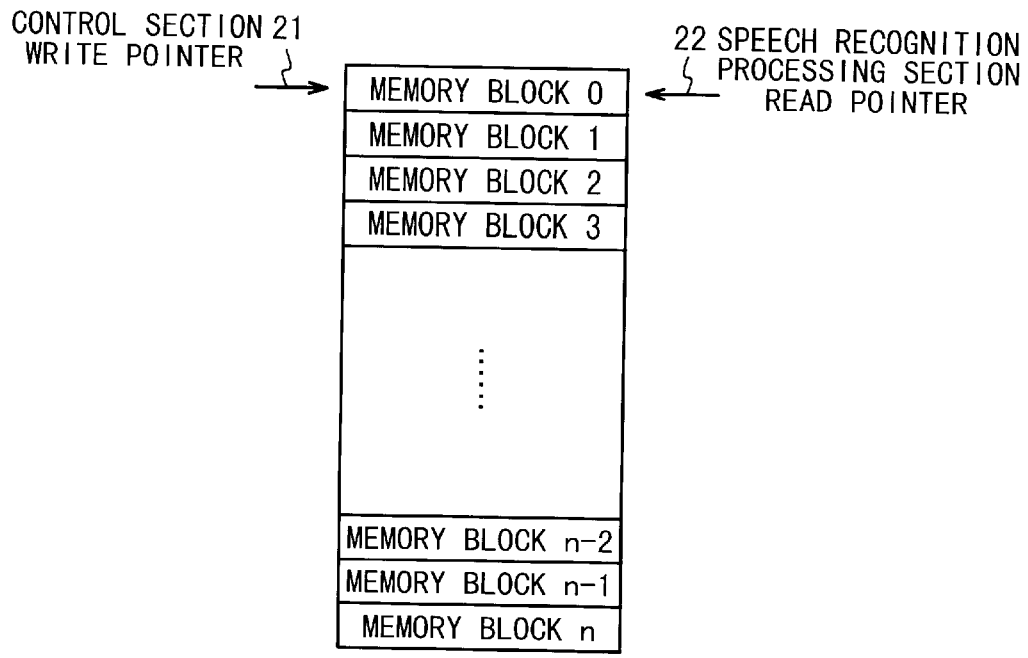
FIGS. 3A and 3B are the internal structures of a speech data reception buffer and a speech recognition result storage section in the portable phone apparatus according to the embodiment of the present invention.

Hereinafter, a radio communication apparatus of the present invention will be described with reference to the attached drawings.

FIG. 1 is a block diagram which shows the circuit structure of the radio communication apparatus such as a portable phone according to an embodiment of the present invention. Referring to FIG. 1, the portable phone is composed of an antenna 1, a common unit 12, a transmitting circuit 13, a modulating circuit 15, a receiving circuit 14, and a demodulating circuit 16. The portable phone is further composed of a control section 3 a signal processing section 4, a microphone 5, a speaker 6, an operating section 7 and an LCD (liquid crystal display) 8. The portable phone is further composed of a speech data reception buffer 17, a speech recognition processing section 9, a speech recognition result storage section 18, a RAM 10 and a ROM 11.

The receiving circuit 14 inputs speech data received by an antenna 1 from a base station (not shown) through a common unit 12. The received speech data is the data that speech on the side of a counter party is coded by a counter portable phone. The received speech data is a 16-bit PCM data containing numeral characters 0 to 9. For example, the received speech data is the data which "1s" and "0s" are randomly arranged like "1100101010101000111000010111 . . . ". The demodulating circuit 16 demodulates the speech data inputted to the receiving circuit 14 to output to the control section 3.

The control section 3 controls each section, as mentioned later. The signal processing section 4 carries out a digital to analog converting process to the demodulated speech data supplied from the control section 3 such that a speech is outputted from the speaker 6. Also, the signal processing section 4 carries out an analog to digital converting process to a speech inputted from the microphone 5. The modulating circuit 15 modulates the speech signal inputted from the microphone via the control section 3. The transmitting circuit 13 transmits the modulated signal supplied from the modulating circuit 15 from the antenna 1 to the base station (not shown) through the common unit 12. Also, the signal processing section 4 has a plurality of tone generators. The signal processing section 4 outputs different sounds from the speaker 6 under the control of the control section 3, when any operation to start, stop or cancel the acquisition of the speech data is carried out.

The control section 3 has a CPU. The control section 3 controls the signal processing section 4 such that a notifying sound is outputted from the speaker 6 in the start, stop or cancellation of the acquisition of speech data. Also, the control section 3 carries out a detecting process of an operation of an operating unit 7 to receive a data and an instruction. Also, the control section 3 controls the LCD 8 to display data such as registered names and telephone numbers. Also, the control section carries out a writing operation of the speech data supplied from the modulating circuit 15 in the speech data reception buffer 17. Also, the control section carries out writing and reading operations to and from the speech recognition processing section 9 or the RAM 10. Moreover, the control section 3 has a timer (not shown) and always has the information of time such as year, month, day, time and minute.

The operating unit 7 is used to input data such as a telephone number and name of a destination and a predetermined data, and instructions such as a call origination instruction, a call termination instruction, an acquisition start instruction and an acquisition end instruction of the speech data.

A ROM 11 stores predetermined speech signal data for speech recognition. The speech signal data for speech recognition are the data obtained by encoding the numeral characters 0 to 9. The speech signal data are used as references for the speech recognition, respectively. That is, the speech signal data is a PCM data of 16 bits, i.e., a data in which "1" and "0" are randomly arranged. In this embodiment, the speech data is phonically allocated to each of the numeral characters. For example, the numeral "0" is allocated with the speech data of combination of "ze" and "ro", or, combination of "re" and "i". The numeral "1" is allocated with the speech data of combination of "i" and "chi". It is desirable that the speech data obtained by coding phonic hiragana characters from "a", "i", "u", . . . , "n" are stored in the ROM 11 in addition to the numeral characters 0 to 9 so that information other than the telephone number can be registered through speech recognition when the destination telephone number is registered. The registered speech data is outputted at the time of read of the telephone number, and the user can recognize whom the destination is.

The speech data reception buffer 17 stores the received speech data temporarily. The speech recognition processing section 9 compares the speech signal data which is stored in the ROM 11 and the received speech data which is stored in speech data reception buffer 17 for the speech recognition under the control of the control section 3. thus, it is determined what the received speech data is. Then, the speech recognition processing section 9 stores the determining result in the speech recognition result storage section 18. For example, the speech data reception buffer 17 and the speech recognition result storage section 18 are composed of RAM. The RAM 10 stores the telephone directory which is composed of a telephone number, a name, and a time as the result of the speech recognition, in addition to the telephone directory registered through the operation of the operating unit 7 by the user. The LCD 8 displays information of the present time, the telephone number of the counter party and the name of the counter party.

FIG. 2 is a flow chart which shows the registering operation of the telephone directory through the speech recognition of the portable phone apparatus of the present invention.

In FIG. 2, during the communication (Step 101) in the portable phone apparatus of the present invention, it is determined whether or not the user has carried out the operation to start the acquisition of the speech data using the operating unit 7 (Step 102). When the operation to start the acquisition of the speech data by the user is carried out (YES at the step 102), a timer (not shown) of the control section 3 is started to count a predetermined time, e.g., 20 seconds (Step 103). The predetermined time counted by the timer may be previously set and may be optionally set by the user. To inform the user that the acquisition of the speech data is started, the signal processing section 4 is controlled by the control section 3 in such a manner that a start confirmation sound such as "pipi" is outputted from speaker 6. Also, the start confirmation sound of "pipi" generated from the signal processing section 4 is transmitted from the transmitting circuit 13 to the destination through the common unit 12, and the antenna 1 to notify that the acquisition of the speech data is started (Step 104).

After the sending-out of the start confirmation sound, the speech data received by the receiving circuit 14 through the antenna 1 and the common unit 12 from the destination is stored in the speech data reception buffer 17 in order (Step 105). Next, it is determined whether or not the user operates the operating unit 7 to stop the acquisition of the speech data in case of the storage of the speech data, that is, to cancel the acquisition (Step 106). When the operation to cancel the acquisition of the speech data is carried out (YES at the step 106), the control returns to the step 102 once again. At this time, to inform the user that the acquisition of the speech data is canceled, the signal processing section 4 is controlled by the control section 3 in such a manner that a cancellation confirmation sound of "pi-pi" is sent out from the speaker 6. Also, it is desirable that the control section 3 controls the signal processing section 4 in such a manner that the cancellation confirmation sound of "pi-pi" is transmitted from the transmitting circuit 13 to the destination through the antenna 1 and the common unit 12 to notify that the registration of the speech data is canceled.

When the operation to cancel or stop the acquisition of the speech data is not carried out by the user (NO at the step 106), it is determined whether or not the timer is in the time out state (Step 107). When the timer is not in the time out state (NO at the step 107), it is determined whether or not the user operates the operating unit 7 to end the acquisition of the speech data (Step 108). The starting and ending operations of the speech data acquisition may be carried out by pushing a start button and an end button (both not shown). Also, the acquisition of the speech data may be started by pushing a button (not shown) and the acquisition of the speech data may be ended by separating the same button. When the operation to end the acquisition of the speech data is not carried out by the user (NO at the step 108), the acquisition of the speech data is continued until the timer is set to the time out state.

When the timer is set to the time out state (YES at the step 107), or when the operation to end the acquisition of the speech data is carried out by the user (YES at the step 108), the signal processing section 4 is controlled by the control section 3 in such a manner that the end confirmation sound of "pi-pi" is sent out from the speaker 6, to inform the user that the acquisition of the speech data is ended. On the other hand, the end confirmation sound generated by the signal processing section 4 is transmitted from the transmitting circuit 13 to the destination through the common unit 12 and the antenna 1 to notify that the acquisition of the speech data is ended (Step 109).

When the control section 3 detects that the timer is set to the time out state or that the operation to end the acquisition of the speech data is carried out by the user, the control section issues a speech recognition instruction to the speech recognition processing section 9. The speech recognition processing section 9 reads the speech signal data stored in the speech data reception buffer 17, and compares the read out speech signal data and the speech signal data which has been previously stored in the ROM 11 for the speech recognition. The speech recognition processing section 9 recognizes the speech signal data stored in the speech data reception buffer 17 based on the comparing result. Then, the speech recognition processing section 9 converts the speech signal data into a character string to stores in the speech recognition result storage section 18 (Step 110). In this case, there is a case that the communication destination outputs its name and information associated with the name in addition to the telephone number. In this case, the speech recognition processing section 9 carries out speech recognition to the name of the communication destination and the information associated with the name in addition to the telephone number to stores in speech recognition result storage section 18.

After that, the speech recognition processing section 9 sends out a data indicative of the speech recognition completion to the control section 3 together with the character string as the speech recognition result (Step 111). When receiving the data indicative of the speech recognition completion from the speech recognition processing section 9, the control section 3 searches a numeral character string contained in the character string. The numeral character string is composed of numeral characters. The control section 3 extracts a telephone number based on the format of the telephone number and the number of digits (Step 112).

When the numeral character string is coincident with one of predetermined formats of telephone number and has the predetermined number of the digits, it is determined that the extraction of the telephone number is succeeded (YES at the step 113). , the control section 3 reads time information from the timer (not shown) in the control section 3 in case of the success of extraction of the telephone number. Then, the control section 3 writes the extracted telephone number, the read out time information and the speech signal data stored in the speech data reception buffer 17, in the RAM 10 as a telephone directory data (Step 114). At this time, it is desirable that the extracted telephone number is stored in the relation to the speech signal data stored in the speech data reception buffer 17, i.e., the speech data used for the extraction. Also, the control section 3 displays a registered telephone number on the LCD 7 (Step 115), and outputs the speech recognition end sound of "pipipi" from the speaker6 to inform the user that the speech recognition is ended (Step 116).

On the other hand, when the numeral character string is not coincident with any predetermined formats of telephone number or does not the predetermined number of digits, that is, when the extraction of the telephone number is failed (NO at the step 113), the control section 3 reads the time information from the timer (not shown) in the control section 3. Then, the control section 3 writes the read out time information and the speech signal data in the RAM 10 as the telephone directory data (Step 117). Also, the control section 3 displays the information indicative of telephone number extraction failure, e.g., "the telephone number cannot not be recognized" on the LCD 7. The control section 3 outputs the speech recognition failure confirmation sound of "pi-pi-pi" from the speaker 6 to notify the speech recognition failure to the user (Step 118). In the case of failure in the extraction of the telephone number, it is not necessary to store in the RAM 10, the information associated with the telephone number which cannot be extracted.

Figure 3B:
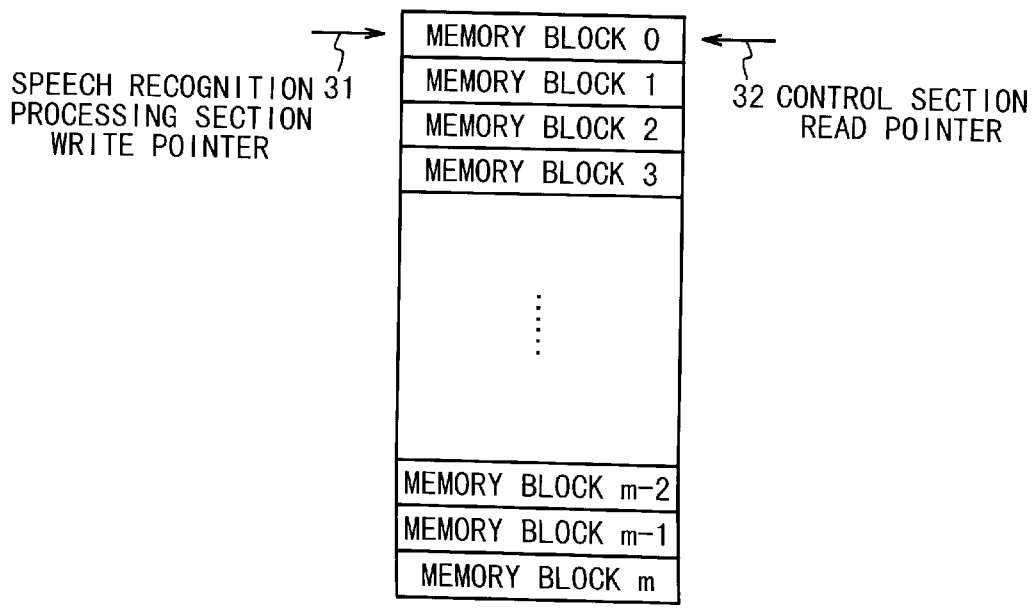

FIG. 3A is the internal structure of the speech data reception buffer 17. FIG. 3B is the internal structure of an example of the speech recognition result storage section 18. As shown in FIGS. 3A and 3B , the speech data reception buffer 17 and the speech recognition result storage section 18 are divided into memory blocks having a predetermined size. Each of the memory blocks is allocated with pointers for read/write. The speech data reception buffer 17 has a control section write pointer 21 which points out an address in the writing operation to a memory block and a speech recognition processing section read pointer 22 which points out an address in the reading operation to a memory block. Also, the speech recognition result storage section 18 has a speech recognition processing section write pointer 31 which points out an address in the writing operation to a memory block and a control section reading pointer 32 which points out an address in the reading operation to a memory block. The initial value of each pointer is memory block 0, and the pointer is incremented by 1 after the writing and reading operations into or from each memory block is ended. The respective pointer values are initialized by the speech data acquisition starting processing at the step 104 of FIG. 2.

FIGS. 4A and 4B are the internal structure of the RAM 10 which stores the telephone directory data. The RAM 10 is composed of the telephone directory storage area shown in FIG. 4A and the speech data storage area shown in FIG. 4B. As shown in FIG. 4A, a telephone directory storage area is composed of a distinguishing data 41, a name storage area 42 and a telephone number storage area 43. When the user operates the operating unit 7, the name of the destination is registered on the name storage area 42, as it is. On the other hand, time information is stored in the name storage area 42 in case of the speech recognition completion, when the time information is recognized using the speech recognition function in this embodiment. Also, when the user operates the operating unit 7, the telephone number is registered on telephone number storage area 43, just as it is. On the other hand, the telephone number extracted from the character string outputted as the recognition result from the speech recognition processing section 9 is stored in the telephone number storage area 43. Thus, the telephone number may be registered using the speech recognition function. When the extraction of the telephone number has failed, only the time information is read out from the timer (not shown) in the control section 3 and is stored in the telephone number storage area 43. The distinguishing data 41 indicates that the user operates the operating unit 7 to directly register the telephone directory data or to register the telephone directory data using the speech recognition function. In the case that the user operated the operating unit 7 to directly register the telephone number, "0" is written as the distinguishing data after telephone number registration is ended. In the case that the speech data from the destination is subjected to the speech recognition and the telephone number is recognized, a data other than "0" is written as the distinguishing data when time information at the time of the speech recognition completion is stored. Therefore, when the extraction of the telephone number has failed, "0" is set to the distinguishing data. Therefore, the distinguishing data of "0" indicates that the name and the telephone number corresponding to the name have been directly registered through the operation of the operating unit 7 by the user, or the extraction of the telephone number has failed. On the other hand, the distinguishing data other than "0" indicates that the name and the telephone number corresponding to the name are registered using the speech recognition function. Also, when the distinguishing data is except for "0", the number shown by the distinguishing data corresponds to an address 51 of the speech data storage area shown in FIG. 4B. The reception speech data in the speech data reception buffer 17 is stored in the speech data storage area shown in FIG. 4B at the address.

Next, the speech recognition processing shown in the step 110 of FIG. 2, that is, the comparing process of the speech signal data stored in the speech data reception buffer 17 and the speech signal data previously stored in the ROM 11 will be described in detail.

Generally, the telephone number starts with he numeral of "0". It is first determined whether or not a data pattern for the numeral of "0" stored in the ROM 11 as references are contained in the speech signal data stored in the speech data reception buffer 17. For the determination, the data pattern of the numeral of "0" and the speech signal data stored in the speech data reception buffer 17 are compared with each other in units of 16 bits from the head. Then, the data pattern similar to the data pattern of the numeral of "0" is searched from the speech signal data stored in the speech data reception buffer 17. The data pattern of the numeral of "0" is a data pattern of combination of "ze" and "ro" or a data pattern of combination of "re" and "i". Therefore, it is determined whether or not either of both data patterns exists in the speech signal data stored in the speech data reception buffer 17. When the data pattern similar to the data pattern of the numeral of "0" as the reference is searched, the numeral of "0" is stored in the speech recognition result storage section 18.

When the data pattern similar to the data pattern of the numeral of "0" is searched from the speech signal data stored in the speech data reception buffer 17, the next data pattern to the data pattern of the numeral of "0" in the speech signal data stored in the speech data reception buffer 17 is compared with the data pattern of the numeral of "0" stored in the ROM 11 as the reference. When the data pattern similar to the data pattern of the numeral of "0" is searched, the numeral of "0" is stored in the speech recognition result storage section 18.

On the other hand, when the data pattern similar to the data pattern of the numeral of "0" is not searched, the speech signal data stored in the speech data reception buffer 17 is compared with the data pattern of the numeral of "1" as the reference. When the data pattern similar to the data pattern of the numeral of "1" as the reference is searched, the numeral of "1" is stored in the speech recognition result storage section 18. On the other hand, when the data pattern similar to the data pattern of the numeral of "1" is not searched, the speech signal data stored in the speech data reception buffer 17 is compared with the data pattern of the numeral of "2" as the reference. After that, the above mentioned process is carried out to the numeral of "9". The speech signal data stored in the speech data reception buffer 17 is not similar to any of the data patterns of the numerals of "0" to "9", "_" (space) is stored in the speech recognition result storage section 18. The comparing process is carried out to the following data pattern of the speech signal data stored in the speech data reception buffer 17. "_" (space) is stored in the speech recognition result storage section 18, when the speech signal data stored in the speech data reception buffer 17 is not similar to any of the data patterns of the numerals of "0" to "9" in the comparing process. Therefore, until the data pattern of the numeral of "0" is searched, no data is stored in the speech recognition result storage section 18. Also, when phonic data patterns from "a" to "n" are stored in the ROM 11 in addition to the data patterns of the numerals of "0" to "9", the speech signal data stored in the speech data reception buffer 17 is subjected to the comparing process with the phonic data patterns for hiragana characters from "a" to "n" in addition to the data patterns of the numerals of "0" to "9". The numerals or phonic hiragana characters are searched are stored in the speech recognition result storage section 18.

Next, a method of extracting the telephone number in the step 113 of FIG. 2 will be described in detail with reference to FIG. 5.

As shown in FIG. 5, a telephone number is generally composed of 9 or 10 digits. Therefore, the control section 3 searches the character string which is sent out from the speech recognition processing section 9. The control section 3 determines whether the number of digits of the numeral character string extracted from the character string is 9 or 10. At this time, the extraction of the telephone number is determined to be failure when the extracted number has equal to or less than eight digits or equal to or more than 11 digits. Also, even if the extracted number has 9 or 10 digits, the numeral character string must be coincident with one of the predetermined formats of the telephone number. When a telephone number of "03-1234-5678" is spoken, they generally says "03no1234no5678". Therefore, the determination of whether or not the numeral character string is coincident with any of the predetermined formats of telephone number is desirably carried out as follows. That it is determined whether or not "no" is present between the second digit and the third digit from the head of the numeral character string or between the third digit and the fourth digit from the head of the numeral character string, and "no" is present between the fifth digit and the sixth digit from the head of the numeral character string or between the sixth digit and the seventh digit from the head of the numeral character string.

Figure 6:
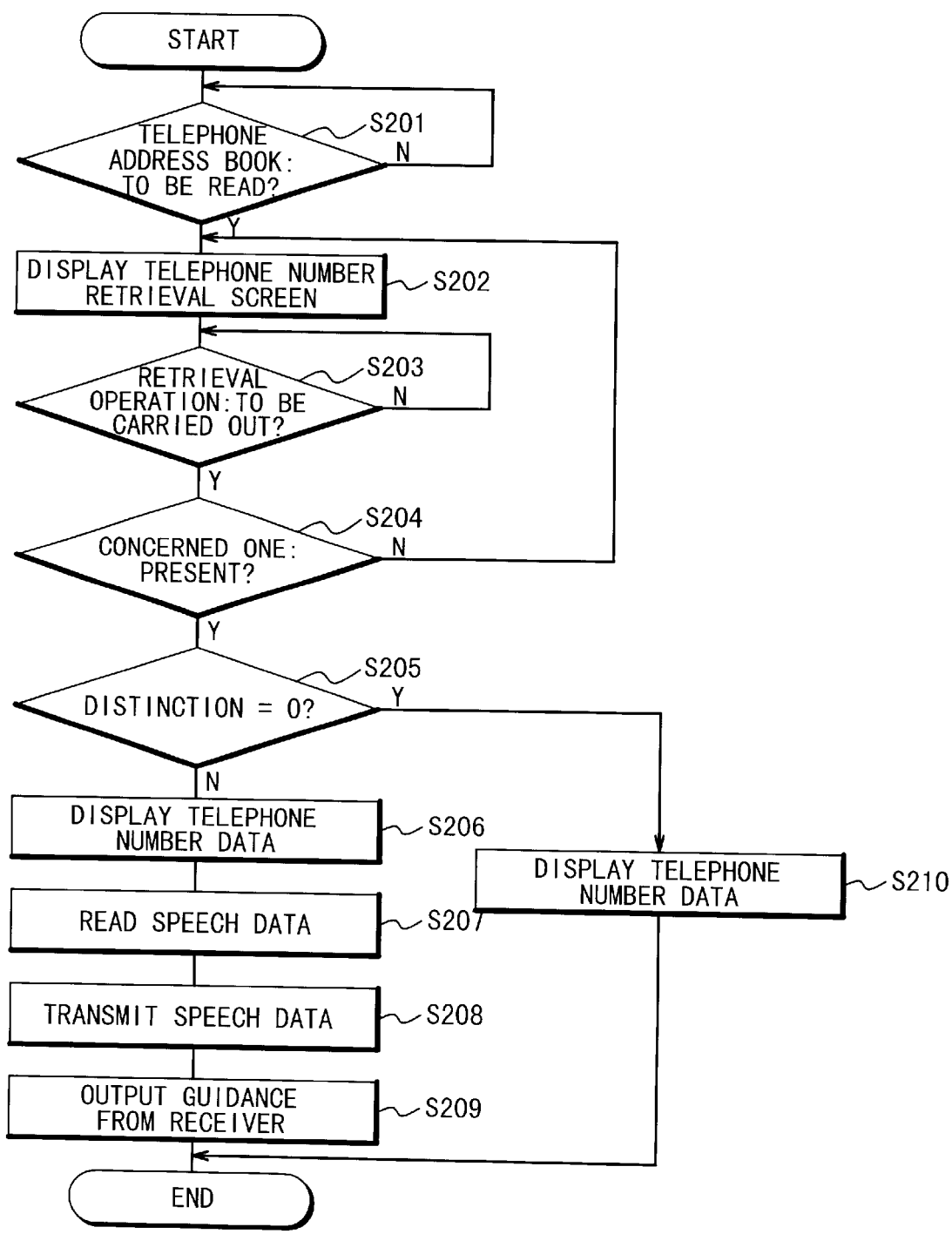
FIG. 6 is a flow chart which shows a reading out operation of the telephone directory data in the portable phone apparatus according to the embodiment of the present invention.

FIG. 6 is a flow chart which shows the call originating operation of the telephone directory in the portable phone apparatus of the present invention. Referring to FIG. 6, when the user reads out the telephone directory, the user operates the operating unit 8 to read out the telephone directory (Step 201). When the reading out operation of the telephone directory is carried out by the user (YES at the step 201), a telephone directory search screen is displayed on the LCD 7 (Step 202). The user performs a searching operation of the telephone directory to operate the operating unit 8 in the state in which the telephone directory search screen is displayed on the LCD 7 (YES at the step 203). At this time, the registered names stored in the name storage area 42 of the telephone directory storage area shown in FIG. 4A are displayed on the LCD 7. In this state, the names displayed on the LCD 7 are stored in the head or last portion of the name storage area 42. When the user pushes a scroll button (not shown) of the operating unit 8, the next names are displayed. When the user pushes a determination button (not shown) of the operating unit 8 in the state in which the names are displayed (YES at the step 204), the control section 3 searches the content of the distinguishing area 41 corresponding to the determined name. Then, the control section 3 determines whether or not the distinguishing data is "0" (Step 205). When the distinguishing data is "0", that is, when the telephone number corresponding to the determined name is directly registered through the operation of the operating unit 7 by the user (YES at the step 205), the telephone number stored in the telephone number storage area 43, and corresponding to the determined name is displayed on the LCD 7 with the determined name (Step 210).

On the other hand, when the distinguishing data is not "0", that is, when the telephone number stored in the telephone number storage area 43 is registered on using the speech recognition function (NO at the step 205), the time information stored in the name storage area 42 and corresponding to the telephone number is displayed on the LCD 7 (Step 206). Also, as shown in FIG. 4B, when the speech signal data stored in the speech data storage area and corresponding to the distinguishing data 41 is read out(Step 207). The speech signal data is sent out from the control section 3 to the signal processing section 4 (Step 208). Then, the speech signal data is subjected to an digital to analog converting process and the speech corresponding to the speech signal data is outputted from the speaker6 (Step 209).

In this embodiment, when the numeral character string contained in the character string of the speech recognition result has any of the predetermined formats of telephone number and the predetermined number of digits, the numeral character string is stored in the RAM 10 as the telephone number. However, the searched numeral character string may be stored in the RAM 10 just as it is, regardless of whether the numeral character string contained in the character string of the speech recognition result has any of the predetermined formats of telephone number and the predetermined number of digits. Also, the predetermined formats of telephone number are not limited to the number form shown in FIG. 5 at all.

As described above, according to the radio communication apparatus of the present invention, it is possible to register a telephone number based on the speech data from the destination. Therefore, the telephone number transmitted from the destination can be registered on the telephone directory and it is not necessary to carry a sheet of paper and a pen. Thus, the operability and the generality can be improved.

Also, when the user reads out the telephone number registered on the telephone directory, the read out telephone number is not only displayed, but also the speech data used when the telephone number is registered is guidance-outputted in the speech. Therefore, the user can recognize an owner corresponding to the telephone number by hearing the speech guidance.

What is claimed is:

1. A radio communication apparatus comprising:

first and second storage sections;

a receiving section receiving a speech data transmitted from a remote caller apparatus, said speech data including a telephone number;

a speech recognizing section;

a control section storing at least a part of said received speech data in a location of said first storage section, extracting said telephone number from said received speech data using said speech recognizing section, and storing said extracted telephone number in said second storage section in association with said predetermined location, wherein said speech recognizing section converts said received speech data into a character string through speech recognition in response to a recognition instruction, said control section generates said recognition instruction to said speech recognizing section and extracts said telephone number from said character string, said control section detects a numeric character string from said character string, and determines that said numeric character string is said telephone number, based on a number of digits of said numeric character string and whether said numeric character string has one of a plurality predetermined telephone number patterns, and said receiving section is configured to start the reception of said speech data in response to an acquisition start instruction and to stop the reception of said speech data in response to an acquisition end instruction.

2. A radio communication apparatus according to claim 1, further comprising an operation section issuing the acquisition start instruction and the acquisition end instruction in response to operations by a user, respectively.

3. A radio communication apparatus according to claim 1, wherein said control section carries out different notifying operations to a user in response to said acquisition start instruction and said acquisition end instruction, respectively.

4. A radio communication apparatus according to claim 1, wherein said control section carries out different notifying operations to a user based on whether or not the extraction of said telephone number is successful.

5. A radio communication apparatus according to claim 1, wherein said second storage section has a first area and a second area, and said control section stores said extracted telephone number as a record in said first area of said second storage section.

6. A radio communication apparatus according to claim 5, wherein said speech recognizing section recognizes a data associated with said extracted telephone number from said received speech data, and
   wherein said control section stores said recognized data associated with said extracted telephone number as a part of said record in said second area of said second storage section.

7. A radio communication apparatus according to claim 5, wherein said second storage section has a third storage area, and
   wherein said control section stores an address of said predetermined location of said first storage section for said extracted telephone number as a part of said record in said third storage area of said second storage section.

8. A radio communication apparatus according to claim 7, further comprising an operation section used to input a data and an instruction; and
   wherein said control section stores a telephone number, a name and a predetermined data as a record in said first to third storage areas of said second storage section, respectively, when said telephone number, said name and said predetermined data are inputted from said operation section by a user.

9. A radio communication apparatus according to claim 8, further comprising a display section,
   wherein said operation section issues a display instruction in response to an operation by the user, and
   wherein said control section displays contents of said records corresponding to said second storage area of said second storage section on said display section in response to said display instruction.

10. A radio communication apparatus according to claim 9, wherein said operation section issues a specify instruction in response to an operation by the user, and
    wherein said control section displays on said display section, said stored telephone number of a specified one of said records which is specified in response to said specify instruction.

11. A radio communication apparatus according to claim 10, further comprising an audio output section, and
    wherein said control section memory move said stored speech data corresponding to said specified record based on a content of said specified record corresponding to said third storage area when the content of said specified record is not said predetermined data, and controls said audio output section to output said read out speech data auditorily.

12. A radio communication apparatus comprising:
    first and second storage sections;
    a receiving section receiving a speech data transmitted from a remote caller apparatus, said speech data including a telephone number;
    a speech recognizing section;
    a control section storing at least a part of said received speech data in a location of said first storage section, extracting said telephone number from said received speech data using said speech recognizing section, and storing said extracted telephone number in said second storage section in association with said predetermined location; and
    a transmitting section,
       wherein said speech recognizing section converts said received speech data into a character string through speech recognition in response to a recognition instruction,
       said control section generates said recognition instruction to said speech recognizing section and extracts said telephone number from said character string,
       said control section detects a numeric character string from said character string, determines that said numeric character string is said telephone number, based on a number of digits of said numeric character string and whether said numeric character string has one of a plurality predetermined telephone number patterns, and
       said control section controls said transmitting section in response to said acquisition start instruction and said acquisition end instruction to transmit first and second sounds to said remote caller apparatus, respectively.

13. A method of improving operability of a radio communication apparatus comprising:
    receiving a speech data transmitted from a remote caller apparatus, said speech data including a telephone number;
    storing at least a part of said received speech data in a location of a first storage section;
    extracting said telephone number from said received speech data by use of a speech recognizing function; and
    storing said extracted telephone number in an address of a second storage section,
    wherein said extracting comprises:
       converting said received speech data into a character string by use of said speech recognition function,
       extracting said telephone number from said character string,
       detecting, by a control section, a numeric character string from said character string; and
       determining that said numeric character string is said telephone number, based on a number of digits of said numeric character string and whether said numeric character string has one of a plurality of predetermined telephone number formats, and
    wherein said receiving comprises starting the reception of said speech data in response to an acquisition start instruction, and
    stopping the reception of said speech data in response to an acquisition end instruction.

14. A method according to claim 13, wherein said receiving includes:
    transmitting first and second sounds to said remote caller apparatus in response to said acquisition start instruction and said acquisition end instruction, respectively.

15. A method according to claim 13, wherein said receiving includes:
    carrying out different notifying operations to a user in response to said acquisition start instruction and said acquisition end instruction, respectively.

16. A method according to claim 13, wherein said extracting includes:
    carrying out different notifying operations to a user based on whether or not the extraction of said telephone number has succeeded.

17. A method according to claim 13, wherein said storing said extracted telephone number includes:
    storing said extracted telephone number as a record in a first area of said second storage section.

18. A method according to claim 17, wherein said extracting includes:
    recognizing a data associated with said extracted telephone number from said received speech data, wherein said method further comprises:

storing said recognized data associated with said extracted telephone number as a part of said record in a second area of said second storage section.

19. A method according to claim 17, further comprising:

storing said address of said first storage section for said extracted telephone number as a part of said record in a third storage area of said second storage section.

20. A method according to claim 19, further comprising:

storing a telephone number, a name and a predetermined data which are inputted by a user as a record in said first to third storage areas of said second storage section, respectively.

21. A method according to claim 20, further comprising:

displaying contents of said records corresponding to said second storage area of said second storage section on a display section in response to a display instruction.

22. A method according to claim 21, further comprising:

displaying on said display section, said stored telephone number of a specified one of said records which is specified in response to a specify instruction.

23. A method according to claim 22, further comprising:

reading out said stored speech data corresponding to said specified record based on a content of said specified record corresponding to said third storage area when the content of said specified record is not said predetermined data; and outputting said read out speech data auditorily.

24. A radio communication apparatus comprising:

a first storage section storing speech data corresponding to a record in association with an address, the speech data output from a speech recognizer;

a second storage section having first to third storage areas, said first storage area storing a telephone number of said record, said second storage area storing an association data of said record, said association data being associated with said telephone number, and said third storage area storing said address;

an input section configured to input data and an instruction;

a display section; and a control section displaying said association data of said records on said display section in response to a display instruction inputted from said input section by a user, wherein said control section detects a numeric character string from a character string converted from said speech data, and determines that said numeric character string is said telephone number based on a number of digits of said numeric character string and based on whether said numeric character string has one of a plurality of predetermined telephone number patterns, and wherein a reception of said speech data is started in response to an acquisition start instruction, and the reception of said speech data is stopped in response to an acquisition end instruction.

25. A radio communication apparatus according to claim 24, wherein said control section stores a telephone number, a name and a predetermined data as a record in said first to third storage areas of said second storage section, respectively, when said telephone number, said name and said predetermined data are inputted from said operation section by a user.

26. A radio communication apparatus according to claim 24, wherein said operation section issues a specify instruction in response to an operation by the user, and wherein said control section displays on said display section, said stored telephone number of a specified one of said records which is specified in response to said specify instruction.

27. A radio communication apparatus according to claim 26, further comprising an audio output section, and wherein said control section reads out said stored speech data corresponding to said specified record based on a content of said specified record corresponding to said third storage area when the content of said specified record is not said predetermined data, and controls said audio output section to output said read out speech data auditorily.

28. A radio communication apparatus comprising:

first and second means for storage;

means for receiving a speech data transmitted from a remote caller apparatus, said speech data including a telephone number;

means for speech recognition; and control section means for storing at least a part of said received speech data in a location of said first means for storage, extracting said telephone number from said received speech data using said means for speech recognition, and storing said extracted telephone number in said second means for storage, wherein said means for speech recognition converts said received speech data into a character string through speech recognition in response to a recognition instruction, and said control section means generates said recognition instruction to said speech recognizing section and extracts said telephone number from said character string, wherein said control section detects a numeric character string from said character string, and determines that said numeric character string is said telephone number based on a number of digits of said numeric character string and based on whether said numeric character string has one of a plurality of predetermined telephone number patterns, and wherein a reception of said speech data is started in response to an acquisition start instruction, and the reception of said speech data is stopped in response to an acquisition end instruction.

* * * * *